US009286325B2

(12) United States Patent
Murray et al.

(10) Patent No.: US 9,286,325 B2
(45) Date of Patent: Mar. 15, 2016

(54) METHODS AND SYSTEMS FOR RANKING IMAGES USING SEMANTIC AND AESTHETIC MODELS

(71) Applicant: Xerox Corporation, Norwalk, CT (US)

(72) Inventors: Naila Murray, Arima (IT); Luca Marchesotti, Grenoble (FR); Florent Perronnin, Domene (FR)

(73) Assignee: Xerox Corporation, Norwalk, CT (US)

( * ) Notice: Subject to any disclaimer, the term of this patent is extended or adjusted under 35 U.S.C. 154(b) by 189 days.

(21) Appl. No.: 13/898,880

(22) Filed: May 21, 2013

(65) Prior Publication Data

US 2014/0351264 A1    Nov. 27, 2014

(51) Int. Cl.
*G06F 7/00* (2006.01)
*G06F 17/30* (2006.01)

(52) U.S. Cl.
CPC .................. *G06F 17/30247* (2013.01)

(58) Field of Classification Search
USPC ........................................................ 707/748
See application file for complete search history.

(56) References Cited

U.S. PATENT DOCUMENTS

| | | | |
|---|---|---|---|
| 6,738,494 B1 | 5/2004 | Savakis et al. | |
| 6,816,847 B1 | 11/2004 | Toyama | |
| 6,847,733 B2 | 1/2005 | Savakis et al. | |
| 8,238,615 B2 | 8/2012 | Cerosaletti et al. | |
| 2007/0203865 A1* | 8/2007 | Hirsch | 706/46 |
| 2008/0004109 A1 | 1/2008 | Kanarat | |
| 2008/0285860 A1 | 11/2008 | Datta et al. | |
| 2008/0317358 A1* | 12/2008 | Bressan et al. | 382/224 |
| 2009/0313294 A1* | 12/2009 | Mei et al. | 707/103 R |
| 2012/0099783 A1 | 4/2012 | Bourdev | |
| 2012/0268612 A1* | 10/2012 | Wang et al. | 348/207.1 |

OTHER PUBLICATIONS

R. Datta and J.Z. Wang. Acquine: aesthetic quality inference engine—real-time automatic rating of photo aesthetics. In MIR, 2010.
Dhar, V. Ordonez, and T.L. Berg. High level describable attributes for predicting aesthetics and interestingness. In CVPR, pp. 1657{1664. IEEE, 2011.
R. Datta, J. Li, and J.Z. Wang. Learning the consensus on visual quality for next-generation image management. In ACM-MM, 2007.
J. San Pedro, T. Yeh, and N. Oliver. Leveraging user comments for aesthetic aware image search reranking. 2012.
T. Joachims. Optimizing search engines using clickthrough data. In SIGKDD, 2002.
L. Yao, P. Suryanarayan, M. Qiao, J.Z. Wang, and J. Li. Oscar: On-site composition and aesthetics feedback through exemplars for photographers. International Journal of Computer Vision, pp. 1{31, 2012.
R. Datta, J. Li, and J.Z. Wang. Studying aesthetics in photographic images using a computational approach, May 7, 2008.
Y. Ke, X. Tang, and F. Jing. The design of high-level features for photo quality assessment. In CVPR, 2006.

* cited by examiner

*Primary Examiner* — Alex Gofman
*Assistant Examiner* — Muluemebet Gurmu (57) ABSTRACT

A method, a system, and a computer program product for extracting one or more images from a storage medium. A search model is selected based on the availability of a semantically related aesthetic model. A search model includes a generic aesthetic model if the semantically related aesthetic model for query is not available. A semantic score and an aesthetic score are computed based on the selected search model. The images are further ranked based on the semantic and aesthetic score.

25 Claims, 5 Drawing Sheets

METHODS AND SYSTEMS FOR RANKING IMAGES USING SEMANTIC AND AESTHETIC MODELS

TECHNICAL FIELD

The presently disclosed embodiments are related, in general, to a ranking system. More particularly, the presently disclosed embodiments are related to systems and methods for ranking images based on the semantic and aesthetic relevance of the images.

BACKGROUND

Advancements in the field of Image Processing and Computer Vision have led to development of various image-searching techniques. Some examples of such image searching techniques include, but are not limited to, content-based image retrieval (CBIR), aesthetic-aware image search re-ranking (AISR), and the like. Such searching techniques may search for an image in a database based on semantics of a query. Certain image searching techniques such as AISR take into account aesthetic relevance of an image while searching. However, image-searching techniques such as AISR have a prerequisite that all the images stored in the database should have an aesthetic rating associated with them. The aesthetic rating is assigned to the images during the training phase of the AISR model.

In certain scenarios, a newly added image in the database may not have an associated aesthetic rating. While searching for an image, AISR may not take into account the newly added image without the aesthetic score.

SUMMARY

According to embodiments illustrated herein, there is provided a method for extracting one or more images from a storage medium. The method includes checking an availability of a semantically related aesthetic model based on a query. At least one of a first search model or a second search model is selected based on the availability of the semantically related aesthetic model. The second search model includes a generic aesthetic model. A semantic score and an aesthetic score are computed for each of one or more images based on the selected search model. Finally, the one or more images are ranked based on the semantic score and the aesthetic score.

According to embodiments illustrated herein, there is provided a method for extracting one or more images from a storage medium. The method includes selecting a semantic model based on a query. Further, the method includes checking the availability of a semantically related aesthetic model based on the query. At least one of a semantically related aesthetic model or a generic aesthetic model is selected based on the availability of the semantically related aesthetic model. A semantic score and an aesthetic score are computed for each of one or more images based on the semantic model and the selected aesthetic model. Finally, the method includes ranking the one or more images based on the semantic score and the aesthetic score.

According to embodiments illustrated herein, there is provided a system for extracting one or more images from a storage medium. The system includes a model selection module, a scoring module, and a ranking module. The model selection module is configured for checking an availability of a semantically related aesthetic model based on a query. The model selection module is further configured for selecting at least one of a first search model or a second search model based on the availability of the semantically related aesthetic model, wherein the second search model includes a generic aesthetic model. The scoring module is configured to compute a semantic score and an aesthetic score based on the selected search model. The ranking module is configured to rank the one or more images based on the semantic score and the aesthetic score.

According to embodiments illustrated herein, there is provided a computer program product for use with a computer. The computer program product includes a computer-usable data carrier storing a computer readable program code for extracting one or more images from a storage medium. The computer readable program code includes a program instruction means for checking an availability of a semantically related aesthetic model based on a query. Further, the computer readable program code includes a program instruction means for selecting at least one of a first search model or a second search model based on the availability of the semantically related aesthetic model. The second search model comprises a generic aesthetic model. The computer readable program code also includes a program instruction means for computing a semantic score and an aesthetic score based on the selected search model. Finally, the computer readable program code includes a program instruction means for ranking the one or more images based on the semantic score and the aesthetic score.

BRIEF DESCRIPTION OF DRAWINGS

The accompanying drawings illustrate various embodiments of systems, methods, and other aspects of the disclosure. Any person having ordinary skill in the art will appreciate that the illustrated element boundaries (e.g., boxes, groups of boxes, or other shapes) in the figures represent one example of the boundaries. It may be that in some examples, one element may be designed as multiple elements or that multiple elements may be designed as one element. In some examples, an element shown as an internal component of one element may be implemented as an external component in another, and vice versa. Furthermore, elements may not be drawn to scale.

Various embodiments will hereinafter be described in accordance with the appended drawings, which are provided to illustrate, and not to limit the scope in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments.

For example, the teachings presented and the needs of a particular application may yield multiple alternate and suitable approaches to implement the functionality of any detail described herein. Therefore, any approach may extend beyond the particular implementation choices in the following embodiments described and shown.

References to "one embodiment", "an embodiment", "one example", "an example", "for example" and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in an embodiment" does not necessarily refer to the same embodiment.

Definitions: The following terms shall have, for the purposes of this application, the respective meanings set forth below.

A "semantic model" refers to a mathematical model that assigns a semantic score to an image based on a content/theme of the image. In an embodiment, the semantic model is trained using a set of sample images, each having a semantic tag.

A "semantic tag" refers to metadata associated with an image. In an embodiment, the semantic tag may correspond, but not limited, to title of the image, image file name, text tag present in the image, and the like. In an embodiment, the semantic tag may correspond to a theme associated with an image. For example, if an image is taken in a party, the associated semantic tag may be "party". Similarly, if an image is taken on a beach, the associated semantic tag may be "beach". In an embodiment, the tag may be assigned by a user. In another embodiment, the tag may be automatically assigned based on the content/theme in the image.

An "aesthetic tag" refers to a metadata assigned to an image based on image features. In an embodiment, the aesthetic tag is indicative of the quality of an image. Examples of aesthetic tag may include, but are not limited to, a Low quality, Medium quality and High quality. In an embodiment, a generic aesthetic model or a semantically related aesthetic model is trained using a set of sample images, each having an aesthetic tag. In an alternate embodiment, the aesthetic tag corresponds to a numeric value in a predetermined range. In an embodiment, the numeric value is indicative of the quality of the image. For example, the predetermined range of aesthetic tags varies from 1 to 10, where 1 corresponds to lowest quality image and 10 corresponds to highest quality image.

A "semantic class" refers to a collection of images that may have same or similar image features. In an embodiment, the semantic class is determined during the training of the semantic model. For example, the semantic class named "beach" would include one or more images having image features that may correspond to beach.

An "image feature" refers to an aspect related to look and feel of the image. In an embodiment, some examples of the image feature may include, but is not limited, low-level image features and high-level image features. In an embodiment, examples of the low-level image features include, but are not limited to, SIFT features, colors, brightness, contrast, Local Binary Patterns (LBP), etc. In an embodiment, examples of the high-level features include, but are limited to, Fisher Vectors, Supervector, VLAD, sparse coding, etc.

An "image expression" refers to an expression associated with a subject included in the image. In an embodiment, the image expression may include, but is not limited to, an expression of happiness, an expression of sadness or any other expression associated with the subject.

An "aesthetic model" refers to a mathematical scoring model that assigns an aesthetic score to an image based on image features. Types of the aesthetic model include, but are not limited to, a semantically related aesthetic model and a generic aesthetic model. A "semantically related aesthetic model" refers to an aesthetic model that is trained for specifically for a semantic model or images having same or similar semantic tags. Such aesthetic model is configured to compute aesthetic score for images that have predetermined semantic tags. For example, if there were a semantically related aesthetic model for images related to "beach", the semantically related aesthetic model would compute aesthetic score for images that have content related or relevant to "beach". In an embodiment, the semantically related aesthetic model cannot compute score for images other than images related or relevant to "beach". In an embodiment, the semantically related aesthetic model compute the aesthetic score based on one or more class specific features. In an embodiment, the semantically related aesthetic model is trained using a set of sample images having a common semantic tag, wherein each image of the set of sample images has an aesthetic tag.

A "generic aesthetic model" refers to an aesthetic model that is independent of the semantics associated with the images to be ranked. For example, no semantically related aesthetic model is available for the images that contain content related to "grass". In such a scenario, generic aesthetic model is selected to compute the aesthetic score for the images. In an embodiment, the generic aesthetic model assigns the aesthetic score to the images based on one or more image features. In an embodiment, a generic aesthetic model a set of sample images, each has an aesthetic tag irrespective of their associated semantic tags.

An "image file" refers to a collection of data including image data in any format retained in electronic form.

Figure 1:
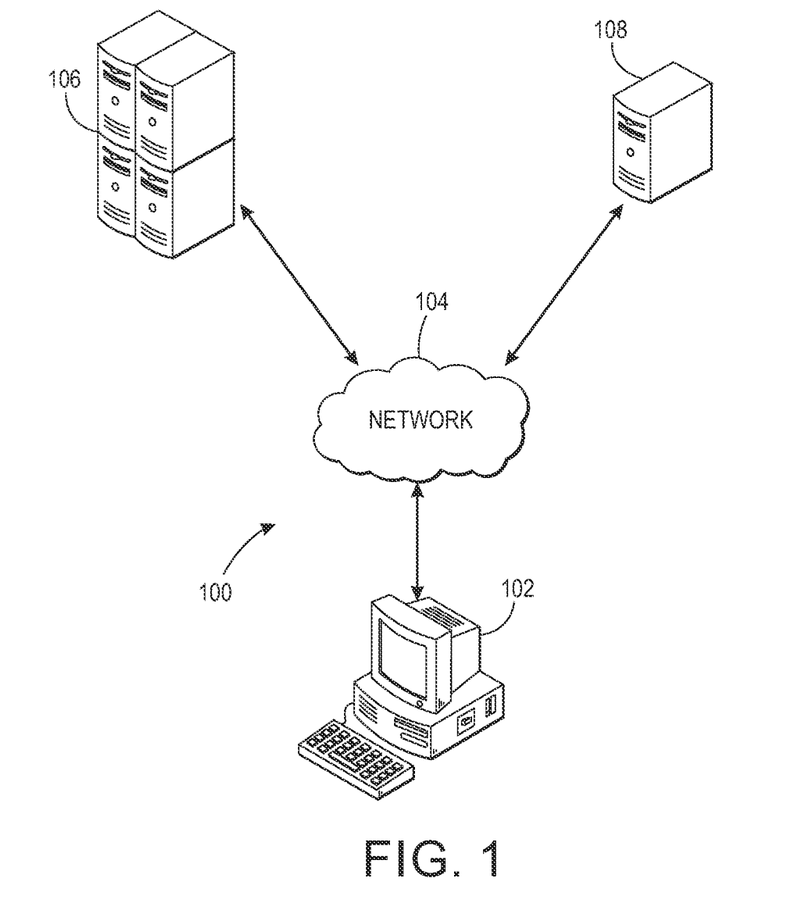
FIG. 1 is a block diagram illustrating a system environment in which various embodiments can be implemented.

FIG. 1 is a block diagram illustrating a system environment 100 in which various embodiments can be implemented. The system environment 100 includes a user device 102, a network 104, an image search server 106, and a storage medium 108.

The user device 102 is a functional unit that performs various computations such as, but not limited to, arithmetic operations and logic operations. The user device 102 facilitates the generation and transmission of a query to the image search server 106 over the network 104. Examples of the user device 102 include, but are not limited to, a personal computer (portable or desktop), a laptop, a tablet, an I-PAD, personal digital assistant (PDA), an MFD, a scanner, a Smartphone, mobile phone, pager or the any other device having capabilities to generate and transmit the query. The user device 102 may be operated by an individual or may be programmed to operate automatically (i.e., timed schedule or triggered by an external event).

The network 104 corresponds to a medium through which the content and the messages flow between various components (e.g., the user device 102, the image search server 106, and the storage medium 108) of the system environment 100. Examples of the network 104 include, but are not limited to, a Wireless Fidelity (WiFi) network, a Wireless Area Network (WAN), a Local Area Network (LAN), and a Metropolitan Area Network (MAN). Various devices in the system environment 100 can connect to the network 104 in accordance with various wired and wireless communication protocols, such as Transmission Control Protocol and Internet Protocol (TCP/IP), User Datagram Protocol (UDP), 2G, 3G or 4G communication protocols.

The image search server 106 searches for one or more images in the storage medium 108 based on a query received from the user device 102. In an embodiment, the image search server 106 includes one or more image searching models that ranks, and extracts the one or more images from the storage medium 108. In an embodiment, the image search server 106 is trained prior to the ranking of the images. The image search server 106 may be realized by any computing device that has a capability to search and rank images. Further, the image search server 106 can be realized on a cloud computing platform such as, but not limited to, Amazon EC2 architecture. The image search server 106 is described later in conjunction with FIG. 2.

In an embodiment, the storage medium 108 includes a repository of the one or more images. In an embodiment, the storage medium 108 receives a query from the image search server 106 to extract the one or more images. The organization of the one or more images in the storage medium 108 is described later in conjunction with FIG. 3. Some examples of the query may include, but are not limited to, SQL query, JDBC, etc. The storage medium 108 may be realized by various technologies such as, but not limited to, Microsoft® SQL server, My SQL, and ODBC server. In an embodiment, the storage medium 108 is included in the image search server 106.

Figure 2:
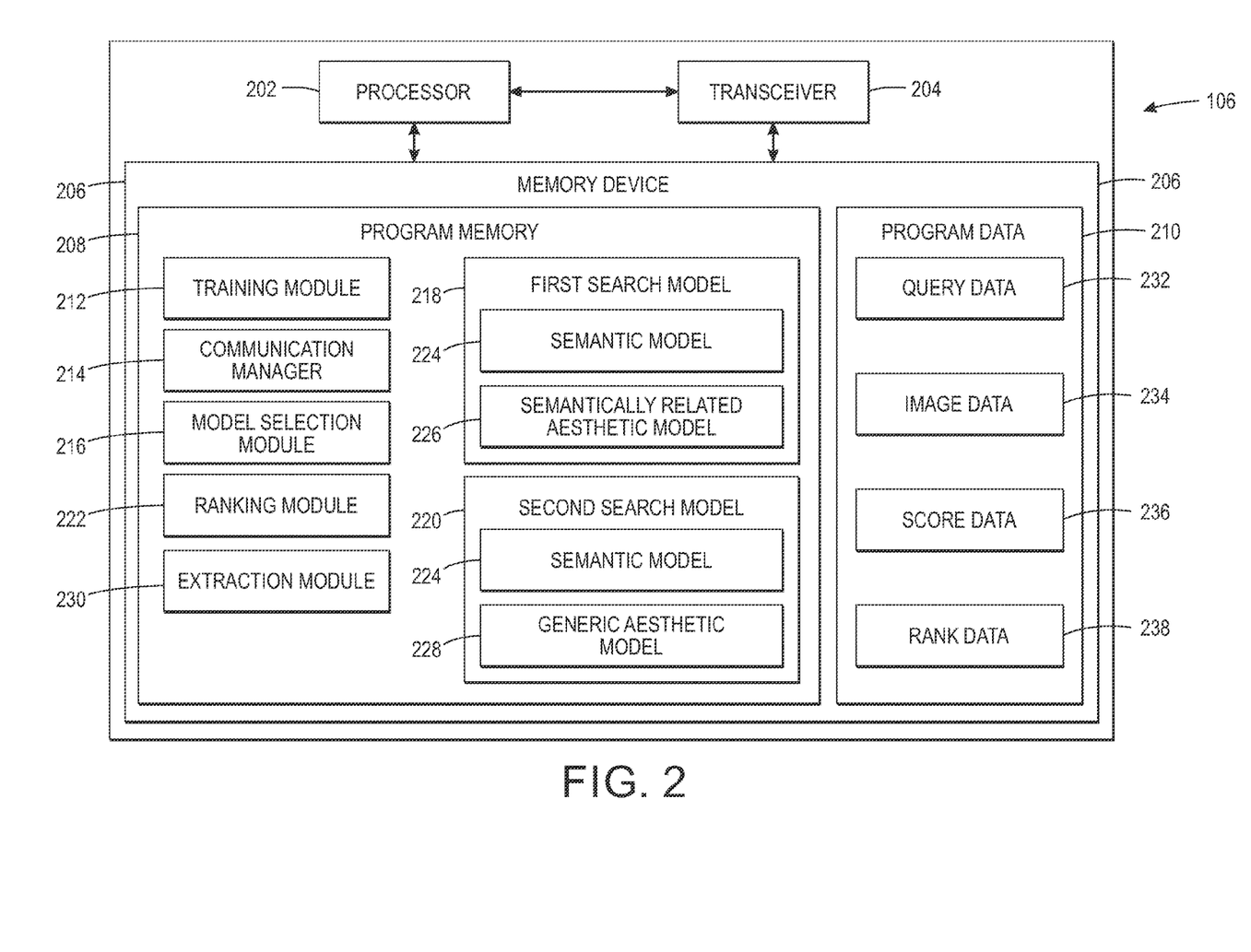
FIG. 2 is a block diagram illustrating an image search server in accordance with at least one embodiment.

FIG. 2 is a block diagram illustrating the image search server 106 in accordance with at least one embodiment. The image search server 106 includes a processor 202 a transceiver 204 and a memory device 206.

The processor 202 is coupled to the transceiver 204 and the memory device 206. The processor 202 executes a set of instructions stored in the memory device 206. The processor 202 can be realized through a number of processor technologies known in the art. Examples of the processor 202 can be, but are not limited to, X86 processor, RISC processor, ARM processor, ASIC processor, and CISC processor.

The transceiver 204 transmits and receives messages and data to/from the various components (e.g., the user device 102 and the storage medium 108) of the system environment 100 (refer FIG. 1). Examples of the transceiver 204 can include, but are not limited to, an antenna, an Ethernet port, a USB port, or any port that can be configured to receive and transmit data from external sources. The transceiver 204 transmits and receives data/messages in accordance with various communication protocols, such as, Transmission Control Protocol and Internet Protocol (TCP/IP), USB, User Datagram Protocol (UDP), 2G, 3G and 4G communication protocols.

The memory device 206 stores a set of instructions and data. Some of the commonly known memory implementations may include, but are not limited to, a random access memory (RAM), a read only memory (ROM), a hard disk drive (HDD), and a secure digital (SD) card. The memory device 206 further includes a program memory 208 and a program data 210. The program memory 208 includes the set of instructions that are executable by the processor 202 to perform specific operations on the image search server 106. It is understood by a person having ordinary skill in the art that the set of instructions stored in the program memory 208 is executed by the processor 202 in conjunction with various hardware of the image search server 106 to perform the various operations. The program memory 208 further includes a training module 212, a communication manager 214, a model selection module 216, a first search model 218, a second search model 220, a ranking module 222 and an extraction module 230.

The program data 210 further includes a query data 232, an image data 234, a score data 236, and a rank data 238.

The training module 212 trains a semantic model 224, a semantically related aesthetic model 226, and a generic aesthetic model 228 on a sample set of images. In an embodiment, the images in the sample set of images have a semantic tag and an aesthetic tag associated with them. The training module 212 trains the semantic model 224 based on the semantic tag associated with the images. During the training of the semantic model 224, the training module 226 determines one or more semantic classes. In an embodiment, each of the one or more semantic classes has one or more associated image features. Further, the training module 212 trains a semantically related aesthetic model 226 based on the aesthetic tags associated with the images having same or similar semantic tags. For the images that don't have same or similar semantic tags, the training module 212 trains a generic aesthetic model 228 based on the aesthetic tags associated with such images irrespective of the semantic tags associated with them. The training module 212 utilizes one or more techniques such as, but is not limited to, large margin classifiers, deep neural networks, and support vector machines (SVM) to train the semantic model, the semantically related aesthetic model, and the generic aesthetic model. Further, the training module 212 utilizes the semantic model 224 and the semantically related aesthetic model 226 to create the first search model 218. Similarly, the training module 212 utilizes the semantic model 224 and the generic aesthetic model 228 to create the second search model 220. The training of the images is described later in conjunction with FIG. 4.

In an embodiment, the communication manager 214 receives a query from the user device 102 to extract one or more images from the storage medium 108. The communication manager 214 implements various protocol stacks such as, but not limited to, Transmission Control Protocol and Internet Protocol (TCP/IP), User Datagram Protocol (UDP), 2G, 3G or 4G communication protocols. The communication manager 214 transmits and receives the messages/data through the transceiver 204 in accordance with such protocol stacks. The communication manager 214 stores the query as the query data 224.

The model selection module 216 extracts the query from the query data 232. Further, the model selection module 216 analyzes the semantics of the query using one or more natural language processing (NLP) techniques. Based on the semantics of the query, the model selection module 216 selects at least one of the first search model 218 and the second search model 220. The selection of the image search model has been described later in conjunction with FIG. 4.

As described, the first search model 218 includes the semantic model 224 and the semantically related aesthetic model 226.

The semantic model 224 assigns a semantic score to each of the one or more images in the storage medium based on the semantics of the query. The semantic model 224 utilizes the semantics of the query to identify the semantic class. Based on the semantic class, the semantic model 224 identifies one or more image features associated with the semantic class. Thereafter, the semantic model 224 utilizes the one or more image features to identify relevant images from the one or more images in the storage medium 108. Further, the semantic model 224 assigns a semantic score to each of the relevant images. In one embodiment, the semantic model 224 utilizes one or more techniques such as SIFT to compute the semantic score.

The semantically related aesthetic model 226 computes aesthetic scores for the relevant images. The semantically related aesthetic model 226 computes the aesthetic score based on one or more class specific image features.

The first search model 218 computes a combined score based on the semantic score and the aesthetic score. The computation of the semantic score, the aesthetic score, and the combined score is described later in conjunction with FIG. 5. The first search model 218 stores the combined score as the score data 236.

The second search model 220 includes the semantic model 224 and a generic aesthetic model 228. In an embodiment, the generic aesthetic model 228 is selected when the semantically related aesthetic model 226 corresponding to the class identified by the semantic model 224 is not present. The generic aesthetic model 228 computes an aesthetic score for each image in storage medium 108 irrespective of the one or more class specific features. The second search model 220 computes a combined score based on the semantic score of the images in the identified class and the aesthetic score of the images in the identified class. The computation of the semantic score, the aesthetic score, and the combined score is described later in conjunction with FIG. 4. The second search model 220 stores the combined score as the score data 236.

The ranking module 222 extracts the combined score for each of the one or more identified images from the score data 236. Based on the combined score, the ranking module 222 ranks the images in the identified class. In an embodiment, the ranking module 222 sorts the images in the identified class in accordance to the combined score. Further, the ranking module 222 stores the rank for each image as rank data 238.

The extraction module 230 extracts the images in the identified class from the storage medium 108 in accordance to the ranks.

Figure 3:
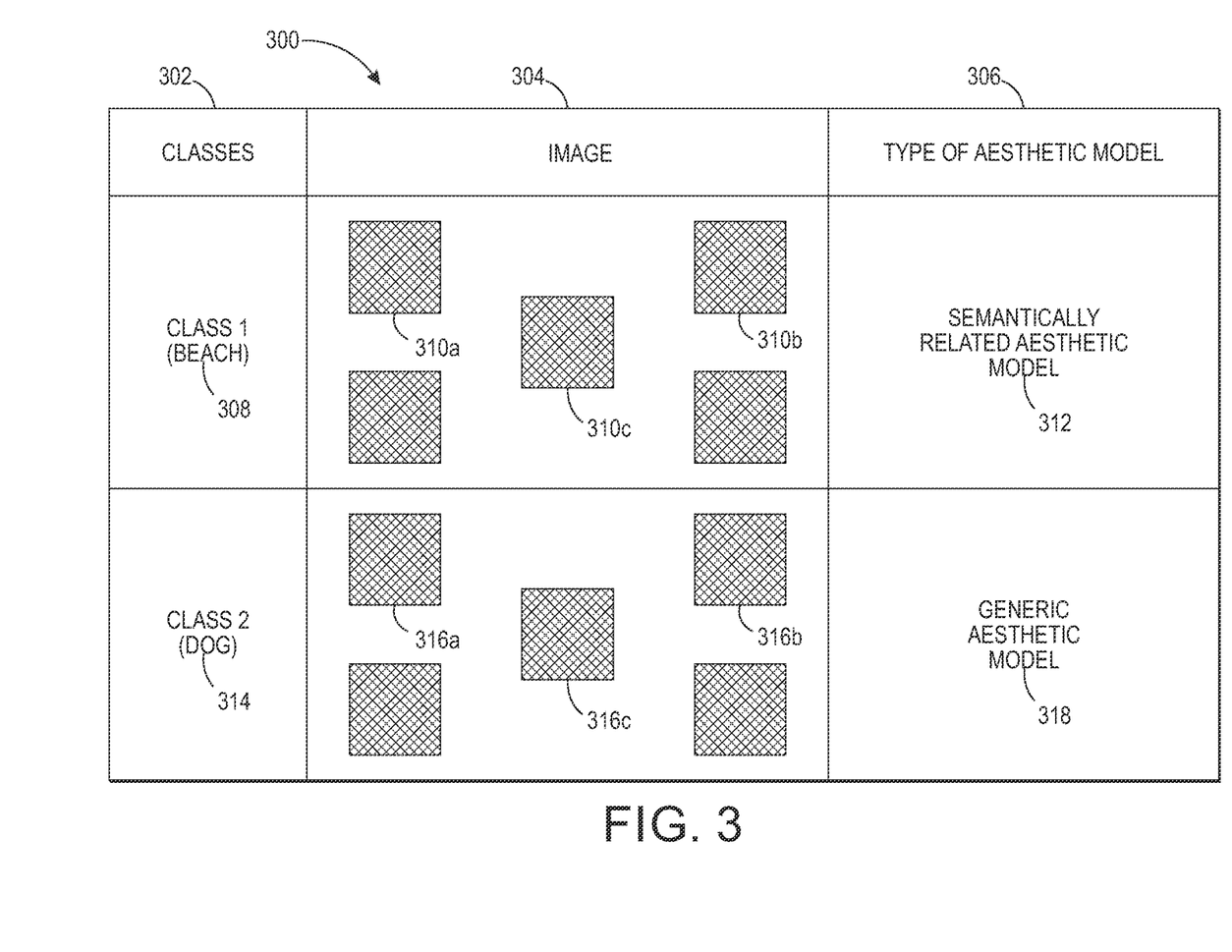
FIG. 3 is a block diagram illustrating an example organization of one or more images in a storage medium in accordance with at least one embodiment.

FIG. 3 is a block diagram 300 illustrating an example organization of one or more images in a storage medium 108 in accordance with at least one embodiment. The block diagram 300 includes a column 302 titled "Classes". The column 302 includes a listing of one or more semantic classes under which the one or more images are classified. For example, Class 1 (depicted by 308) includes images that are semantically related to term "beach". Similarly, Class 2 (depicted by 314) includes images that are semantically related to term "dog". Column 304 includes a set of images classified in respective classes. For example, images 310a and 310b are classified under the Class 1 (depicted by 308). Similarly, images 316a, 316b, and 316c are classified under the Class 2 (depicted by 314). In an embodiment, the block diagram 300 includes a column 306 titled "Type of Aesthetic model available". The column 306 illustrates the type of aesthetic model available for the class. For example, for Class 1 (depicted by 308) the semantically related aesthetic model 226 is available (depicted by 312) and for Class 2 (depicted by 314) the generic aesthetic model 228 is available (depicted by 318).

Figure 4:
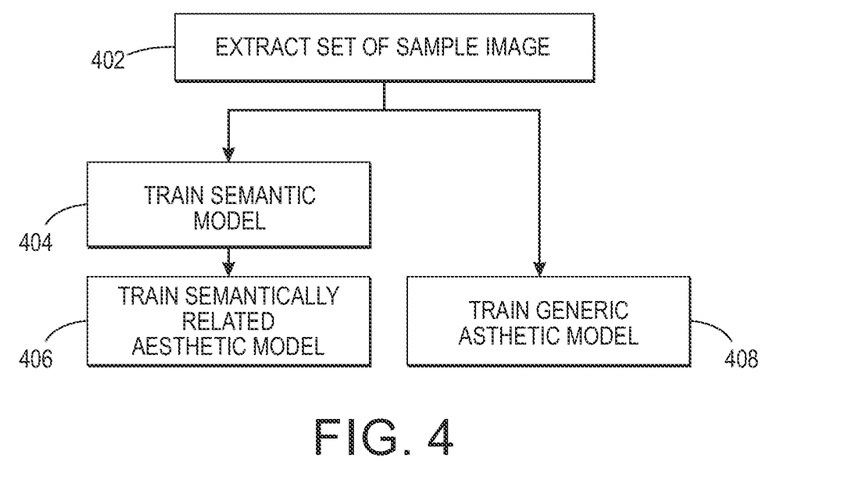
FIG. 4 is a flowchart illustrating a method for training a semantic model, a semantically related aesthetic model, and a generic aesthetic model.

FIG. 4 is a flowchart 400 illustrating a method for training the semantic model 224, the semantically related aesthetic model 226, and the generic aesthetic model 228. The flowchart 400 is described in conjunction with FIG. 3.

At step 402, the training module 212 extracts the sample set of images from the storage medium 108. In an embodiment, each image in the sample set of images has a semantic tag and an aesthetic tag. Further, images in the sample set of images are pre-classified in one or more classes based on the semantic tags. The images having same semantic tags are classified under the same class. For example, the images having semantic tags "beach", "cost" are classified under a class named "beach".

At step 404, the semantic model 224 is trained. In an embodiment, the training module 212 trains the semantic model 224 based on the semantic tags associated with the images. In an embodiment, the semantic model 224 is trained on the images having same or similar semantic tags by extracting image features of the images. The image features are stored as the image data 234. For example, the sample set of images includes a first set of images having a semantic tag "beach" and a second set of images having semantic tag "dog". The training module 212 trains the semantic model 224 on the images having semantic tag "beach". The semantic model extracts and compares the one or more image features associated with each image in the first set of images to determine common image features associated with the first set of images having semantic tag "beach". Similarly, the semantic model 224 is trained on the second set of images having semantic tag "dog". The training module 212 stores the common image features associated with the first set of images and the second set of images as the image data 234. Further, the training module 212 defines a semantic class for each set of common image features. For example, semantic class "beach" is defined for common image features of the images having semantic tag "beach".

At step 406, the semantically related aesthetic model 226 is trained based on the aesthetic tags assigned to the images having same or similar semantic tags. In an embodiment, the aesthetic tag is indicative of the quality of the image. For example, the image might be tagged as high quality, low quality, or a medium quality. The training module 212 compares the images in the same class having different aesthetic tags to identify differentiating image features. The differentiating image features are indicative of the reason for which the image is rated high quality or low quality. For example, a class named "beach" includes a first image, a second image and a third image having high, medium, and low image quality, respectively. The training module 212 would compare the image features of the first image with the image features of the second image to identify differentiating image features that make the first image high quality and the second image medium quality. The semantically related aesthetic model 226 is trained based on the differentiating image features. The training module 212 stores the differentiating image features as the image data 234. Further, the training module associates the differentiating image features with the semantic class determined in step 404.

Additionally, at step 408, the generic aesthetic model 228 is trained by the training module 212. In an embodiment, the training module 212 employs similar method to train the generic aesthetic model 228 as used for training the semantically related aesthetic model 226. The training module 212 trains the generic aesthetic model based on aesthetic tag assigned to each image in the sample set of images irrespective of the semantic tags.

Figure 5:
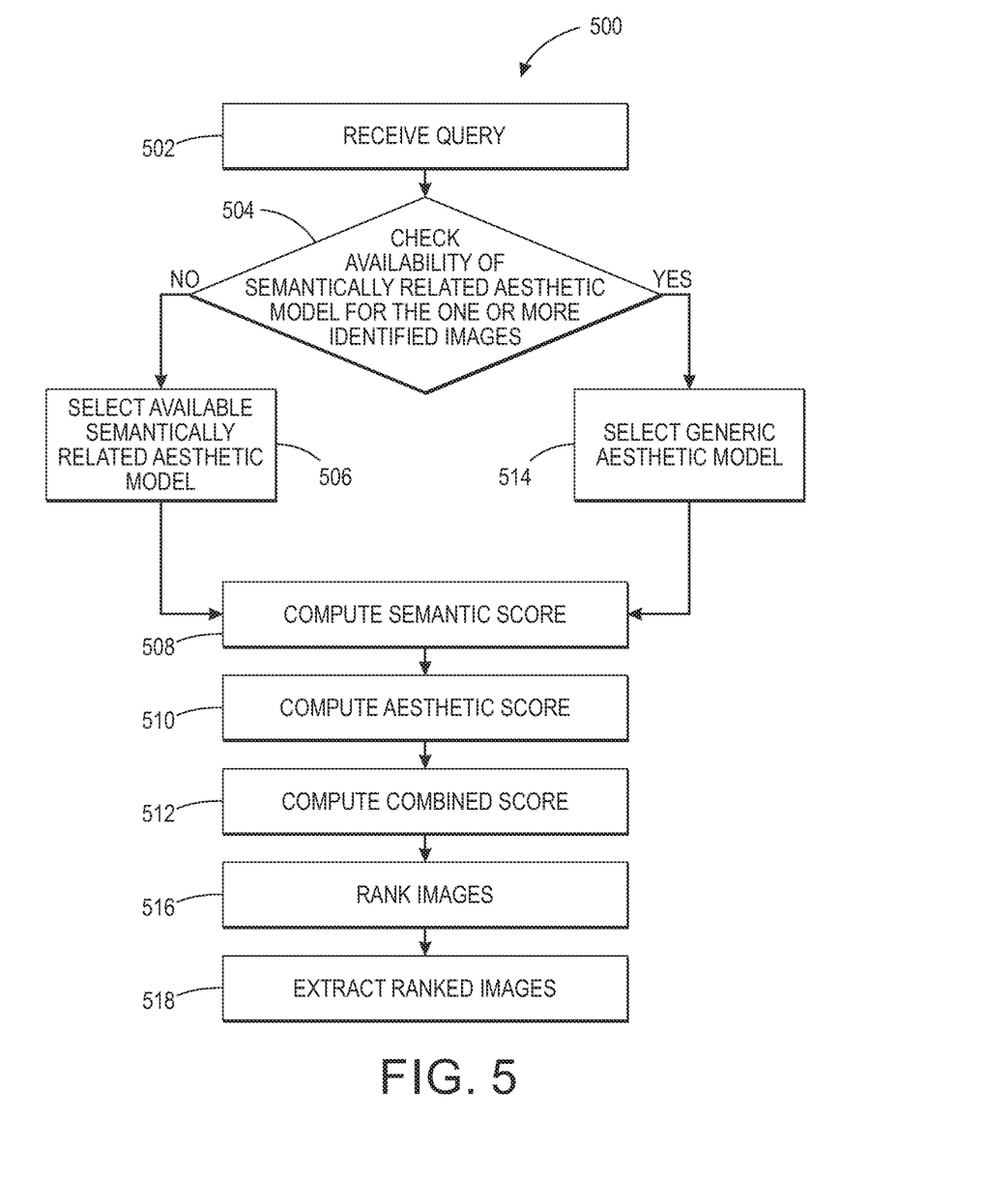
FIG. 5 is a flowchart illustrating a method for ranking the images in accordance with at least one embodiment.

FIG. 5 is a flowchart 500 illustrating a method for ranking the images in accordance with at least one embodiment. The flowchart 500 is described in conjunction with FIG. 1 and FIG. 2.

At step 502, a query is received from the user device 102. In an embodiment, the communication manager 214 receives the query from the user device 102 through the transceiver 204. The communication manager 214 stores the query as the query data 232. Prior to receiving the query, the training module 212 trains the first search model 218 and the second search model 220 as described in conjunction with FIG. 4.

At step 504, a check is performed whether a semantically related aesthetic model 226 for the semantics identified from the query. In an embodiment, the model selection module 216 checks the availability of a semantically related aesthetic model 226. In an embodiment, the check is performed based on the semantics of the query. The model selection module 216 extracts the semantics of the query by applying one or more NLP techniques (e.g., POS tagger). In an embodiment, model selection module 216 identifies a semantic class based on the semantics of the query. For example, the query received from the user device 102 includes terms "beautiful beach", the model selection module 216 would apply NLP technique to determine that the query corresponds to "beach". The model selection module 216 identifies the semantic class "beach". The model selection module 216 checks whether semantically related aesthetic model 226 for the semantic class titled "beach" is available. In an embodiment, the model selection module 216 searches for the preconfigured semantically related aesthetic model 226 for the semantic "beach" in the first search model 218. If the semantically related aesthetic model 226 is found, a step 506 is performed.

At step 506, the determined semantically related aesthetic model 226 is selected. In an embodiment, the model selection module 216 selects the determined semantically related aesthetic model 226.

At step 508, a semantic score is computed based on the semantics of the query. In an embodiment, the semantic model 224 computes the semantic score. The semantic model 224 determines the class that corresponds to the semantics of the query. Based on the determined semantic class, the semantic model 224 determines one or more common image features corresponding to the semantic class. Further, the semantic model 224 extracts image features for each of the one or more images in the storage medium 108. Thereafter, the semantic model 224 compares the common image features for the class with the image features of the individual images. Based on the comparison the semantic model 224 determines a probability that an image corresponds to the semantic class. In an embodiment, the probability corresponds to the semantic score. Based on the semantic score, the semantic model 224 determines a set of relevant images. In an embodiment, the semantic model 224 utilize following equations to compute the semantic score:

$$\text{Semantic score} = P(y|x) \quad (1)$$

where,
x is an image feature assigned to image; and
y is a semantic class identified from the semantic of the query.

At step 510, an aesthetic score is computed for each image in the determined relevant images. In an embodiment, if at step 504 the semantically related aesthetic model 226 is selected, the semantically related aesthetic model 226 is used for computing the aesthetic score. The semantically related aesthetic model 226 extracts semantic class specific differentiating image features (determined during training of the semantically related aesthetic model 226) from the image data 234. In an embodiment, the differentiating image features are used to compare images to determine the quality of the image. The semantically related aesthetic model 226 analyzes each of the relevant images to compute the aesthetic score. In an embodiment, the semantically related aesthetic model 226 analyzes the one or more images based on one or more differentiating image features to determine the quality of the image. For example, for the images in the semantic class "beach", the differentiating image features include, color-vibrancy in color of the water, contrast of colors between sea, beach, and flora around the beach etc. The semantically related aesthetic model 226 computes an aesthetic score based on the differentiating image features. In an embodiment, the semantically related aesthetic model 226 computes a conditional probability that an image would have an aesthetic tag given the image features and the semantic class associated with the image. In an embodiment, semantically related aesthetic model 226 utilizes following equation to compute the aesthetic score:

$$\text{Aesthetic score} = P(z|x,y) \quad (2)$$

where,
z is an aesthetic tag assigned to image.

For example, there are three images in the class "beach". First image is highly semantically relevant. Second image is less semantically relevant in comparison to first image. The third image is least semantically relevant. Further, the second image displays beautiful coastline and good color vibrancy between the sea, coast and flora around the coast. Thus, there is a high probability that the semantically related aesthetic model 226 would assign a high aesthetic score to the second image in comparison to the first image and the third image.

At step 512, a combined score is computed using the aesthetic score and the semantic score. In an embodiment, the first search model 218 computes the combined score for the images in the determined semantic class. In an embodiment, the first search model 218 computes the combined score using the following expression:

$$p(y,z|x) = p(y|x)p(z|y,x) \quad (3)$$

If at step 504 it is determined that the semantically related aesthetic model 226 corresponding to the semantics of the query is not available, a step 514 is executed. At step 514, the generic aesthetic model 228 is selected. In an embodiment, the model selection module 216 selects the generic aesthetic model 228. The generic aesthetic model 228 is used for computing the aesthetic score is computed for each of the one or more images in the storage medium 108. The generic aesthetic model 228 analyzes the one or more images in the class based on generic features associated with the one or more images. In an embodiment, examples of generic features include, but are not limited to, rule of thirds, contrast, brightness, sharpness, colorfulness, resolution, etc. In an embodiment, the generic features are independent of the class in which the image has been classified. In an embodiment the generic aesthetic model 228 applies the following equations to compute the aesthetic score:

$$\text{Aesthetic score} = P(z|x) \quad (4)$$

In an alternate embodiment, U.S. Pat. No. 6,847,733 B2 (U.S. application Ser. No. 09/863,570), filed May 23, 2001, published Jan. 25, 2005, and assigned to the Eastman Kodak Company, and which is herein incorporated by reference in its entirety, discloses one example of computing aesthetic score.

A combined score is computed for the images in the class determined by the semantically related aesthetic model 226. In an embodiment, the second scoring model computes the combined score by using the following equations:

$$p(y,z|x) = p(y|x)p(z|x) \quad (5)$$

At step 516, the images are ranked according to their combined score. In an embodiment, the ranking module 222 assigns ranks to all the images corresponding to their combined scores.

At step 518, the ranked images are extracted. In an embodiment, the extraction module 230 extracts the one or more images based on the ranks assigned at step 516.

The disclosed embodiments encompass numerous advantages. As disclosed, the semantic model and the semantically related aesthetic model are trained separately on the images having same or similar semantic tags. Further, a generic aesthetic model is trained on the irrespective of the semantic tags associated with them. Due to presence of a dedicated semantically related aesthetic model for the images having same or similar semantic tags, the computation of the aesthetic score is much accurate in comparison to the existing art. Further, computing semantic score and aesthetic score independently and thereafter combining the score gives better and more accurate images search results.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit and the Internet. The computer further comprises a microprocessor. The microprocessor is connected to a communication bus. The computer also includes a memory. The memory may be Random Access Memory (RAM) or Read Only Memory (ROM). The computer system further comprises a storage device, which may be a hard-disk drive or a removable storage drive, such as, a floppy-disk drive, optical-disk drive, etc. In an embodiment, the storage device may correspond to cloud storage space. The storage device may also be a means for loading computer programs or other instructions into the computer system. The computer system also includes a communication unit. The communication unit allows the computer to connect to other databases and the Internet through an Input/output (I/O) interface, allowing the transfer as well as reception of data from other databases. The communication unit may include a modem, an Ethernet card, or other similar devices, which enable the computer system to connect to databases and networks, such as, LAN, MAN, WAN, and the Internet. The computer system facilitates inputs from a user through input device, accessible to the system through an I/O interface.

The computer system executes a set of instructions that are stored in one or more storage elements, in order to process input data. The storage elements may also hold data or other information, as desired. The storage element may be in the form of an information source or a physical memory element present in the processing machine.

The programmable or computer readable instructions may include various commands that instruct the processing machine to perform specific tasks such as, steps that constitute the method of the disclosure. The method and systems described can also be implemented using only software programming or using only hardware or by a varying combination of the two techniques. The disclosure is independent of the programming language and the operating system used in the computers. The instructions for the disclosure can be written in all programming languages including, but not limited to, 'C', 'C++', 'Visual C++' and 'Visual Basic'. Further, the software may be in the form of a collection of separate programs, a program module containing a larger program or a portion of a program module, as discussed in the ongoing description. The software may also include modular programming in the form of object-oriented programming. The processing of input data by the processing machine may be in response to user commands, results of previous processing, or a request made by another processing machine. The disclosure can also be implemented in various operating systems and platforms including, but not limited to, 'Unix', DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for ranking images using semantic and aesthetic models have been disclosed. However, it should be apparent to those skilled in the art that many more modifications, besides those described, are possible without departing from the inventive concepts herein. The embodiments, therefore, are not to be restricted, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or utilized, or combined with other elements, components, or steps that are not expressly referenced.

A person having ordinary skills in the art will appreciate that the system, modules, and sub-modules have been illustrated and explained to serve as examples and should not be considered limiting in any manner. It will be further appreciated that the variants of the above disclosed system elements, or modules and other features and functions, or alternatives thereof, may be combined to create many other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules and is not limited to any particular computer hardware, software, middleware, firmware, microcode, etc.

The claims can encompass embodiments for hardware, software, or a combination thereof.

It will be appreciated that variants of the above disclosed, and other features and functions or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for extracting one or more images from a storage medium, the method comprising:
   determining a semantic class from a query based on a natural language processing technique;
   checking an availability of a semantically related aesthetic model for the determined semantic class, wherein the semantically related aesthetic model corresponds to an aesthetic model that is configured to compute an aesthetic score for a first image that is associated with a predetermined semantic class, and wherein the semantically related aesthetic model is unable to compute aesthetic score for a second image that is associated with a semantic class other than the predetermined semantic class;
   selecting a first search model or a second search model based on the availability of the semantically related aesthetic model, wherein the first search model comprises a semantic model and the semantically related aesthetic model, wherein the second search model comprises the semantic model and a generic aesthetic model, wherein the first search model is selected when the semantically related aesthetic model is available for the determined semantic class, and wherein the second search model is selected when the semantically related aesthetic model is unavailable for the determined semantic class;

computing a semantic score and an aesthetic score for each of the one or more images based on the selected search model; and ranking the one or more images based on the semantic score and the aesthetic score.

2. The method of claim 1, wherein the availability of the semantically related aesthetic model is checked based on semantics of the query.

3. The method of claim 1, wherein the semantic model and the semantically related aesthetic model are trained on a sample set of images, wherein each image in the sample set of images has an associated semantic tag and an aesthetic tag.

4. The method of claim 1, wherein the semantic score is computed based on the semantic model.

5. The method of claim 1, wherein the aesthetic score is computed based on the semantically related aesthetic model and the semantic model.

6. The method of claim 5, wherein the semantically related aesthetic model computes the aesthetic score based on one or more image features and the determined semantic class.

7. The method of claim 6, wherein the one or more image features comprise low level features and high level features.

8. The method of claim 7, wherein the low level features comprises at least one of SIFT features, colors, brightness, contrast, or Local Binary Patterns (LBP).

9. The method of claim 7, wherein the high level features comprises at least one of Fisher Vectors, Supervector, VLAD, or sparse coding.

10. The method of claim 1, wherein the aesthetic score is computed based on the generic aesthetic model.

11. The method of claim 10, wherein the generic aesthetic model computes the aesthetic score for the one or more images based on an image feature associated with each of the one or more images, and wherein the generic aesthetic model computes the aesthetic score independent of the determined semantic class associated with each of the one or more images.

12. The method of claim 1 further comprises computing a combined score based on the aesthetic score and the semantic score, wherein the ranking is performed based on the combined score.

13. The method of claim 1 further comprising training the semantic model, the semantically related aesthetic mode, and the generic aesthetic model using at least one of large margin classifiers, deep neural networks, and support vector machines (SVM).

14. A method for extracting one or more images from a storage medium, the method comprising:

selecting a semantic model based on a semantic class determined from a query;

checking an availability of a semantically related aesthetic model for the determined semantic class, wherein the semantically related aesthetic model corresponds to an aesthetic model that is configured to compute an aesthetic score for a first image that is associated with a predetermined semantic class, and wherein the semantically related aesthetic model is unable to compute aesthetic score for a second image that is associated with a semantic class other than the predetermined semantic class;

selecting one of the semantically related aesthetic model or a generic aesthetic model based on the availability of the semantically related aesthetic model for the determined semantic class, wherein the semantically related aesthetic model is selected if available, and wherein the generic aesthetic model is selected when the semantically related aesthetic model is unavailable for the semantic class;

computing a semantic score and an aesthetic score for each of the one or more images based on the semantic model and the selected aesthetic model, respectively; and ranking the one or more images based on the semantic score and the aesthetic score.

15. The method of claim 14, wherein the aesthetic score is computed by the semantically related aesthetic model based on one or more image features associated with the one or more images and the determined semantic class.

16. The method of claim 14, wherein the aesthetic score is computed by the generic aesthetic model based on one or more image features associated with the one or more images independent of the determined semantic class.

17. The method of claim 14 further comprises computing a combined score based on the aesthetic score and the semantic score, wherein the ranking of the one or more images is based on the combined score.

18. A system for extracting one or more images from a storage medium, the system comprising:

a processor configured to:

determine a semantic class from a query based on a natural language processing technique;

check an availability of a semantically related aesthetic model for the determined semantic class determined from a query, wherein the semantically related aesthetic model corresponds to an aesthetic model that is configured to compute an aesthetic score for a first image that is associated with a predetermined semantic class, and wherein the semantically related aesthetic model is unable to compute aesthetic score for a second image that is associated with a semantic class other than the predetermined semantic class;

select a first search model or a second search model based on the availability of the semantically related aesthetic model, wherein the first search model comprises a semantic model and the semantically related aesthetic model, wherein the second search model comprises the semantic model and a generic aesthetic model, wherein the first search model is selected when the semantically related aesthetic model is available for the determined semantic class, and wherein the second search model is selected when the semantically related aesthetic model is unavailable for the determined semantic class;

compute a semantic score and an aesthetic score for each of the one or more images based on the selected search model; and rank the one or more images based on the semantic score and the aesthetic score.

19. The system of claim 18, wherein the first search model computes the semantic score based on the semantic model.

20. The system of claim 18, wherein the first search model utilizes the semantically related aesthetic model to compute the aesthetic score based on one or more image features associated with each of the one or more images and the determined semantic class.

21. The system of claim 18, wherein the second search model comprises a semantic model and the generic aesthetic model.

22. The system of claim 21, wherein the second search model computes the aesthetic score by utilizing the generic aesthetic model based on one or more image features associated with each of the one or more images, wherein the generic aesthetic model computes the aesthetic score independent of the determined semantic class.

23. The system of claim 18, wherein the is further configured to compute a combined score based on the aesthetic score and the semantic score, wherein the ranking of the one or more images are based on the combined score.

24. The system of claim 18, wherein the system is implementable on at least one of an elastic cloud computing architecture.

25. A computer program product for use with a computer, the computer program product comprising a non-transitory computer-usable data carrier storing a computer readable program code embodied therein for extracting one or more images from a storage medium, the computer readable program code comprising:

a program instruction means for determining a semantic class from a query based on a natural language processing technique;

a program instruction means for checking an availability of a semantically related aesthetic model for the determined semantic class, wherein the semantically related aesthetic model corresponds to an aesthetic model that is configured to compute an aesthetic score for a first image that is associated with a predetermined semantic class, and wherein the semantically related aesthetic model is unable to compute aesthetic score for a second image that is associated with a semantic class other than the predetermined semantic class;

a program instruction means for selecting a first search model or a second search model based on the availability of the semantically related aesthetic model, wherein the first search model comprises a semantic model and the semantically related aesthetic model, wherein the second search model comprises the semantic model and a generic aesthetic model, wherein the first search model is selected when the semantically related aesthetic model is available for the determined semantic class, and wherein the second search model is selected when the semantically related aesthetic model is unavailable for the determined semantic class;

a program instruction means for computing a semantic score and an aesthetic score for each of the one or more images based on the selected search model; and a program instruction means for ranking the one or more images based on the semantic score and the aesthetic score.

\* \* \* \* \*